United States Patent [19]
Konno et al.

[11] Patent Number: 5,706,134
[45] Date of Patent: Jan. 6, 1998

[54] LIGHT-DIFFUSING SHEET MEMBER

[75] Inventors: Teruaki Konno, Tokyo; Koichi Sawada; Masahiro Kitamura, both of Osaka, all of Japan

[73] Assignee: Keiwa Shoko Kabushiki Kaisha, Osaka, Japan

[21] Appl. No.: 658,314

[22] Filed: Jun. 5, 1996

Related U.S. Application Data

[63] Continuation of Ser. No. 954,304, Sep. 30, 1992, abandoned.

[30] Foreign Application Priority Data

| Jun. 22, 1919 | [JP] | Japan | 4-042936 U |
| Oct. 9, 1991 | [JP] | Japan | 3-082008 U |
| Jan. 13, 1992 | [JP] | Japan | 4-000679 U |

[51] Int. Cl.$^6$ .................................................. G02B 5/02
[52] U.S. Cl. .......................................... 359/599; 359/452
[58] Field of Search ............................. 359/599, 452, 359/453, 455, 456, 460; 354/452

[56] References Cited

U.S. PATENT DOCUMENTS

| 2,294,930 | 9/1942 | Palmquist . | |
| 3,269,835 | 8/1966 | Flint | 359/599 |
| 3,491,237 | 1/1970 | Tillett | 250/71 |
| 3,612,650 | 10/1971 | Miyaho | 359/452 |
| 3,655,263 | 4/1972 | Hoffman et al. . | |
| 3,726,583 | 4/1973 | Fujisaki et al. | 359/452 |
| 3,984,176 | 10/1976 | Hirai et al. . | |
| 3,994,086 | 11/1976 | Mizouchi . | |
| 4,068,922 | 1/1978 | Dotsko | 359/452 |
| 4,989,933 | 2/1991 | Duguay | 385/901 |
| 5,170,285 | 12/1992 | Shibasaki | 359/599 |

FOREIGN PATENT DOCUMENTS

| 2503663 | 8/1975 | Germany . | |
| 2721885 | 11/1978 | Germany . | |
| 2925647 | 12/1980 | Germany . | |
| 3625767 | 2/1987 | Germany . | |
| 56-139189 | 3/1980 | Japan . | |
| 55-120001 | 9/1980 | Japan | 359/599 |
| 55-120002 | 9/1980 | Japan | 359/599 |
| 62-116201 | 7/1987 | Japan . | |
| 62-169105 | 7/1987 | Japan . | |
| 62-201729 | 12/1987 | Japan . | |
| 63-41101 | 3/1988 | Japan . | |
| 63-177884 | 11/1988 | Japan . | |
| 63-291001 | 11/1988 | Japan | 359/599 |
| 2-120702 | 5/1990 | Japan | 359/599 |
| 2-214822 | 8/1990 | Japan . | |
| 2-221926 | 9/1990 | Japan | 359/599 |
| 1585338 | 2/1981 | United Kingdom . | |
| 2054119 | 2/1981 | United Kingdom . | |

OTHER PUBLICATIONS

*Patents Abstracts of Japan*, P-735, Jul. 26, 1988, Vol. 12/No. 266.

*Primary Examiner*—Jon W. Henry
*Attorney, Agent, or Firm*—Marshall, O'Toole, Gerstein, Murray & Borun

[57] ABSTRACT

A light diffusing sheet member used as a diffusing plate of a liquid crystal display by which light transmitted from a light source is uniformly diffused so that the luminance of a screen of a light diffusing plate liquid crystal display portion is sufficient and a user can easily look at characters, graphics and the like displayed on the screen from different angles. A light diffusing sheet member comprises a base material sheet and a light diffusing layer applied on the top face of the base material sheet, and beads mixed therein. The beads have different sizes, and include particles buried in a synthetic resin and particles which at least partially project from the synthetic resin.

4 Claims, 5 Drawing Sheets

Fig. 4A
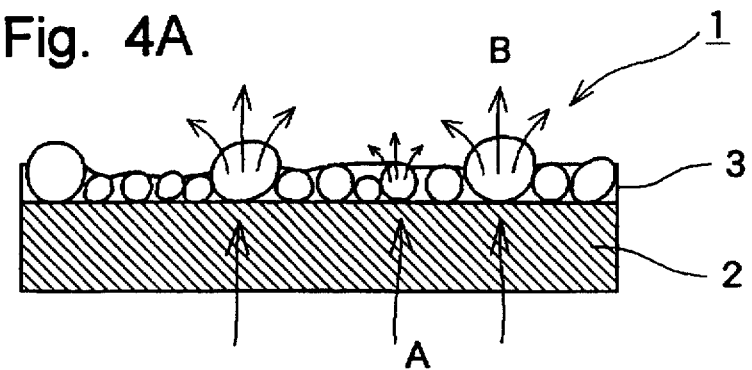
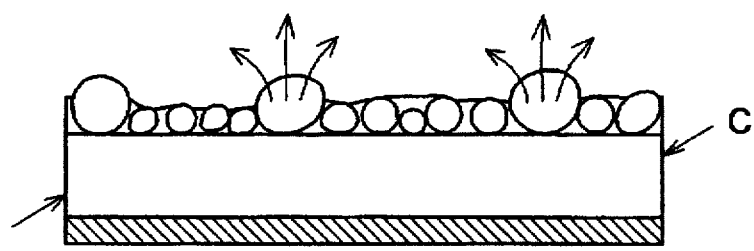
Fig. 4B
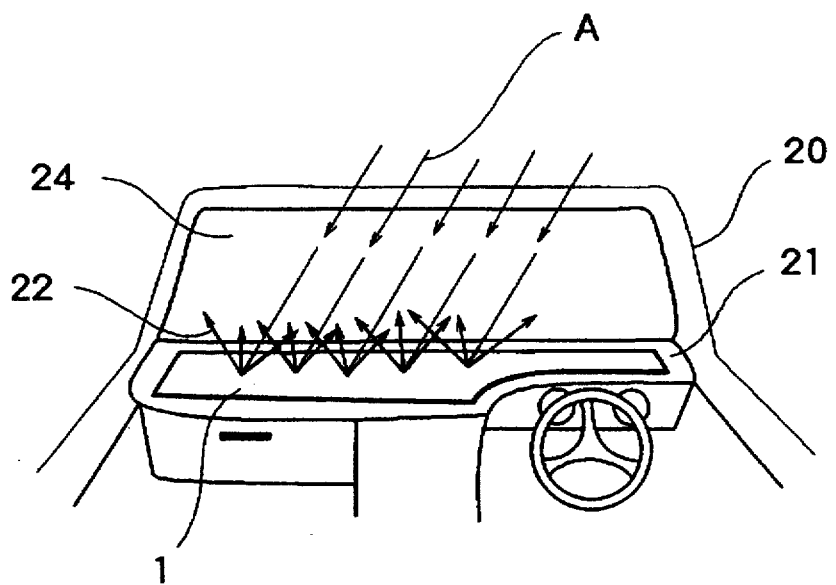
Fig.5

LIGHT-DIFFUSING SHEET MEMBER

This is a continuation of U.S. application Ser. No. 07/954,304, filed Sep. 30, 1992, now abandoned.

FIELD AND BACKGROUND OF THE INVENTION

The present invention relates to a light diffusing sheet member which uniformly diffuses light, and more particularly to a light diffusing sheet member for use as a light diffusing plate that uniformly diffuses light transmitted from a light source which is the back light of a liquid crystal panel in a liquid crystal display.

In a prior art liquid crystal display 10 as shown in FIG. 6, light irradiated by a fluorescent tube 11, which is a back light, passes through a guide plate 12. The fluorescent tube 11 is provided on the backside of a liquid crystal panel. On the bottom face of the guide plate 12 is provided a reflecting portion which consists of a metal deposition layer, which is formed by deposition of a metal such as silver or aluminum. The light guided upwardly is uniformly diffused and passed by a diffusing plate 13 provided above the guide plate 12, and is then guided to a liquid crystal display unit 14 provided above the diffusing plate 13.

Conventionally, the diffusing plate 13 comprises a light diffusing sheet member wherein a resin such as polycarbonate which is melted and extruded on the surface of a base material is finished by means of a pressing and cooling roll (so-called mat roll) or the like having many fine concave and convex portions impressed on its surface so that the resin has fine concave and convex portions on its surface, or the resin is heated and pressurized by means of a pressing roll having many fine convex portions on its surface so that the resin has many fine concave and convex portions (embossed).

(1) Japanese Utility Model Publication No. 26481/1991 discloses a light diffusing sheet member in which a light diffusing layer is affixed to the surface of a polyester film or the like, the light diffusing layer containing light diffusing materials such as titanium oxide, calcium carbonate, talc, silica powder, glass beads and the like.

(2) Japanese Unexamined Utility Model Publication No. 11201/1991 discloses a light diffusing sheet member in which light is uniformly irradiated from a light source to the outside through a sheet body irrespective of the distance from the light source by means of a pattern display having a difference in the distribution of density caused by a minute material group for light reflection such as aluminum powder or silver powder which is provided on the light irradiation face of the sheet body on the light source side.

However, the light diffusing sheet member used as a diffusing plate of a liquid crystal display according to the prior art has the following drawbacks.

According to the light diffusing sheet member in publication No. 26481/1991, a light diffusing material is affixed to the film surface so that uniform light diffusion cannot fully be performed.

According to the light diffusing sheet member in publication No. 11201/1991, it is necessary that the difference in distribution be set great when the distance from the light source is increased. Accordingly, the structure is complicated and costs are increased.

In both of the above light diffusing sheet members, the luminance of the screen of a liquid crystal display portion is not sufficient. Consequently, it is hard or impossible to read characters, graphics and the like displayed on the screen, depending on the viewing angle.

It is an object of the present invention to provide a light diffusing sheet member wherein light is uniformly diffused and more particularly to a light diffusing sheet member used as a diffusing plate which uniformly diffuses light transmitted from a light source in a liquid crystal display, so that the luminance of a screen of a light diffusing plate liquid crystal display portion is sufficient and a user can easily look at characters, graphics and the like displayed on the screen from different angles.

SUMMARY OF THE INVENTION

The present invention has been made in consideration of the above-mentioned problems and object, and comprises a light diffusing sheet member characterized in that a light diffusing layer is formed on the surface of a base material sheet, the light diffusing layer being a synthetic resin layer having beads mixed therein.

The base material sheet is transparent and the light diffusing layer is a transparent synthetic resin layer having transparent beads mixed therein.

The light diffusing layer has beads mixed therein, the beads having different sizes.

The beads include particles buried in the synthetic resin layer and particles which at least partially project from the synthetic resin layer.

The beads cover almost the entire surface of the base material sheet.

A metal deposition layer is formed on the back of the base material sheet.

BRIEF DESCRIPTION OF THE DRAWINGS

The foregoing and other objects, features and advantages of the present invention will become more apparent upon a reading of the following detailed description and the drawings, wherein:

FIG. 2 (b) is a sectional view showing a light diffusing sheet member according to a second embodiment of the present invention;

FIG. 4 (a) is a partial sectional view illustrating the state of light diffusion performed by the light diffusing sheet member according to the first embodiment of the present invention;

FIG. 4 (b) is a partial sectional view illustrating the state of light diffusion performed by the light diffusing sheet member according to the second embodiment of the present invention;

FIG. 5 is a perspective view showing an application of the light diffusing sheet member in accordance with the present invention;

DETAILED DESCRIPTION OF THE INVENTION

Preferred embodiments of the present invention are be described in detail with reference to the figures of the accompanying drawings.

Figure 1A:
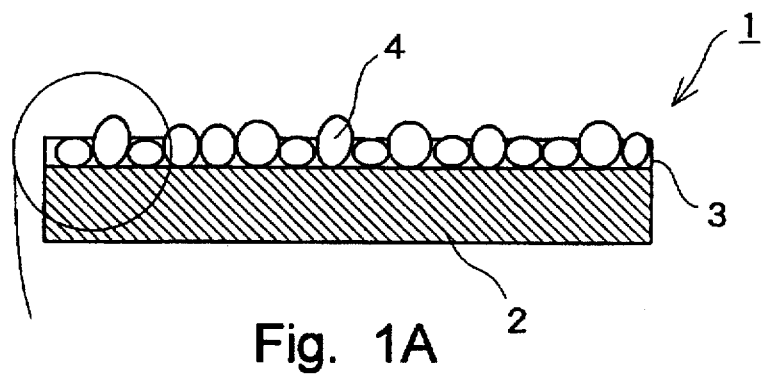
FIG. 1(a) is a partially enlarged sectional view showing a light diffusing sheet member according to a first embodiment of the present invention.
Figure 1B:
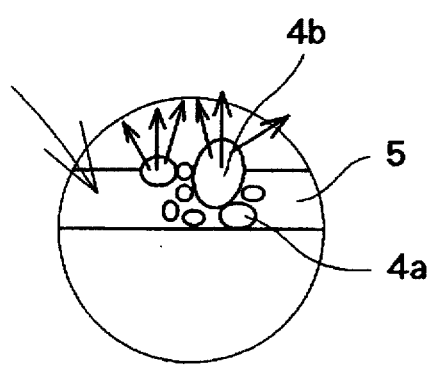
FIG. 1(b) is a blowup of a portion of FIG. 1(a)

In FIG. 1 (a), the reference numeral 1 denotes a light diffusing sheet member which essentially comprises a transparent base material sheet 2 and a light diffusing layer 3 applied thereon.

Preferable examples of the base material sheet 2 include a transparent glass substrate and a synthetic resin film such as polyethylene terephthalate (PET), polycarbonate (PC) or a transparent acrylic resin having a thickness of about 20 to 300 μm. There can be used any base material sheet which is transparent, does not inhibit light from passing and has elasticity, durability and the like, according to the use of the sheet.

The light diffusing layer 3 is formed by a synthetic resin 5 (FIG. 1A) and the like as a base layer. There are mixed, in the synthetic resin 5 base layer, one or more kind(s) of bead particles 4 such as a urethane resin, a vinyl chloride resin, an acrylic resin or glass.

In consideration of light diffusing effects, the ratio of the beads particles 4 to the synthetic resin 5 is suitably 30 to 90% by weight. If the ratio is smaller than 30% by weight, desirable light diffusing effects cannot be obtained. If the ratio is greater than 90% by weight, the adhesion of the bead particles 4 to the synthetic resin 5 is poor so that the beads particles 4 easily come off.

In order to obtain good light diffusing effects, the size of the bead particles 4 is suitably about 1 to 50 μm. In addition, it is preferred that two or more kinds of beads having different sizes are mixed. In consideration of working properties, strength and light diffusing effects, it is preferred that the synthetic resin 5 include an acrylic resin as a main agent having bead particles mixed therein, and a resin of a two-liquid hardening type using an isocyanate synthetic resin as a hardening agent and having a thickness of about 15 to 20 μm (including no beads particles). However, there can be used other kinds of bead particles and synthetic resins by which desirable light diffusing effects may be obtained. The light diffusing layer 3 having beads particles may properly be applied on the top face of the base material sheet 2 by a known blade roll coating method or the like.

Figure 7A:
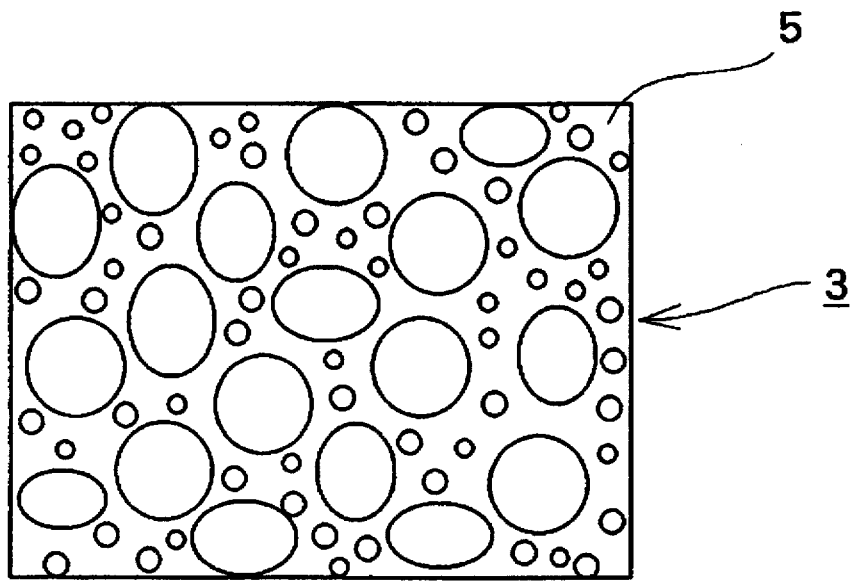
FIGS. 7 (a) and 7 (b) are plan views showing the distribution pattern of bead particles on the diffusing layer of the light diffusing sheet member in accordance with the present invention.
Figure 7B:
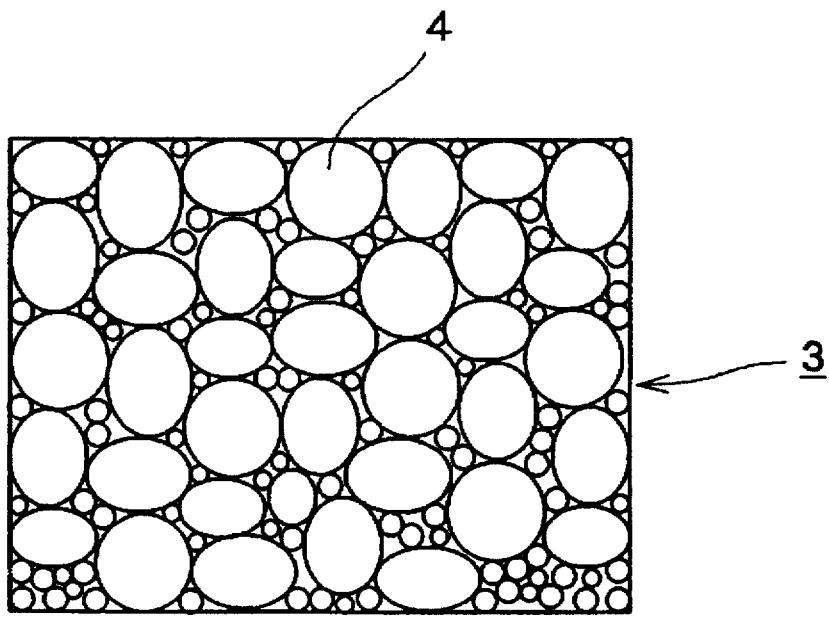

It is always required that particles 4a and particles 4b be mixed in the synthetic resin 5 so that light transmitted through the base material sheet 2 is uniformly diffused through the light diffusing layer 3. As shown in FIG. 1 (b), the particles 4a are completely buried in the synthetic resin 5, and the particles 4b are partially buried in the synthetic resin 5 and at least partially project from the synthetic resin 5. The ratio of particles to be mixed can suitably be changed according to the desired light diffusing ratio. The bead particles 4 may be distributed over the surface of the base material sheet 2 as shown in FIG. 7 (a), and may cover almost the entire surface of the base material sheet 2 as shown in FIG. 7 (b). In the latter case with greater density of the bead particles, light to be transmitted can be diffused more uniformly.

As mentioned above and as shown in the drawings, relatively large size and small size beads are provided. The ratio of the number of small size beads to the large size beads is in the range from 1:99 to 99:1; preferably in the range from 5:95 to 95:5. Some of the beads are totally embedded and others are partially embedded. The ratio of the number of totally embedded beads or particles to the partially embedded beads or particles is in the range from 1:99 to 99:1; preferably in the range from 5:95 to 95:5.

With the light diffusing sheet member having the above-mentioned structure, light A (FIG. 4 (a)) is transmitted from below the base material sheet 2 of the light diffusing sheet member 1, passes through the base material sheet 2, and into a layer having the particles 4a and 4b so as to be uniformly diffused by the particles as shown in FIG. 4 (a) (see an arrow B). The particles 4a are completely buried in the synthetic resin 5 of the light diffusing layer 3 (see FIG. 1 (b)). The particles 4b are partially buried in the synthetic resin 5 and at least partially project from the synthetic resin 5.

Figure 2A:
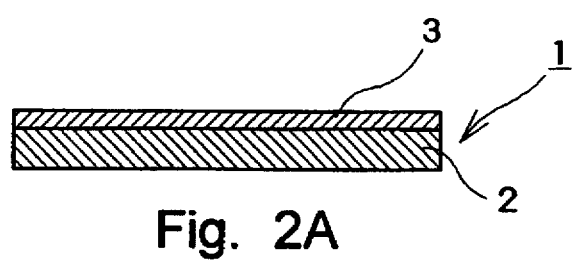
FIG. 2 (a) is a sectional view showing the light diffusing sheet member according to the first embodiment of the present invention.
Figure 2B:
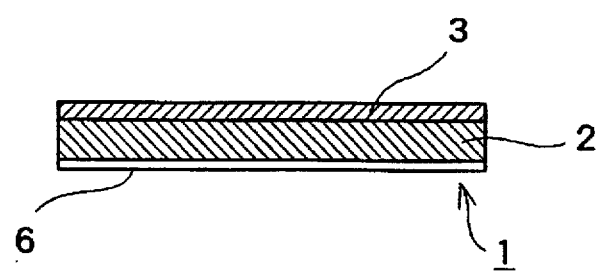

With reference to FIG. 2 (a), the light diffusing sheet member of the second embodiment has the same structure as that of the first embodiment except that there is provided a metal deposition layer 6 which is formed by depositing a metal such as silver or aluminum on the bottom face of a base material sheet 2.

Referring to the light diffusing sheet member having the above-mentioned structure of the present invention (see FIG. 4 (b)), light C transmitted through the side of the base material sheet 2 of a light diffusing sheet member 1 is reflected by the metal deposition layer 6 formed on the bottom face of the base material sheet 2 and an interface between the base material sheet 2 and a light diffusing layer 3 formed on the top face of the base material sheet 2, guided to the light diffusing layer 3 and then uniformly diffused in the same manner as in the first embodiment shown in FIG. 4 (a).

Figure 3A:
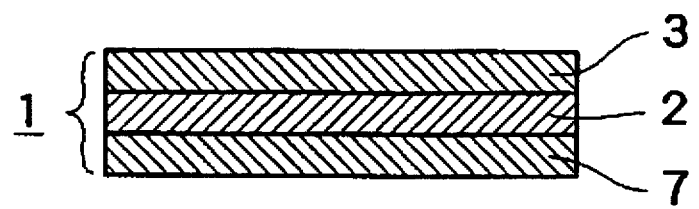
FIGS. 3 (a) and 3 (b) are sectional views showing variations of the light diffusing sheet member in accordance with the present invention.
Figure 3B:
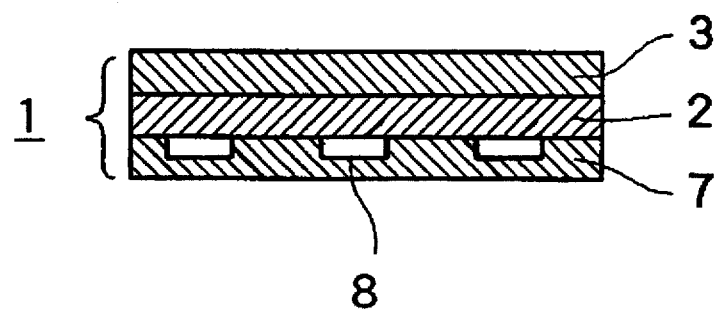
Figure 6:
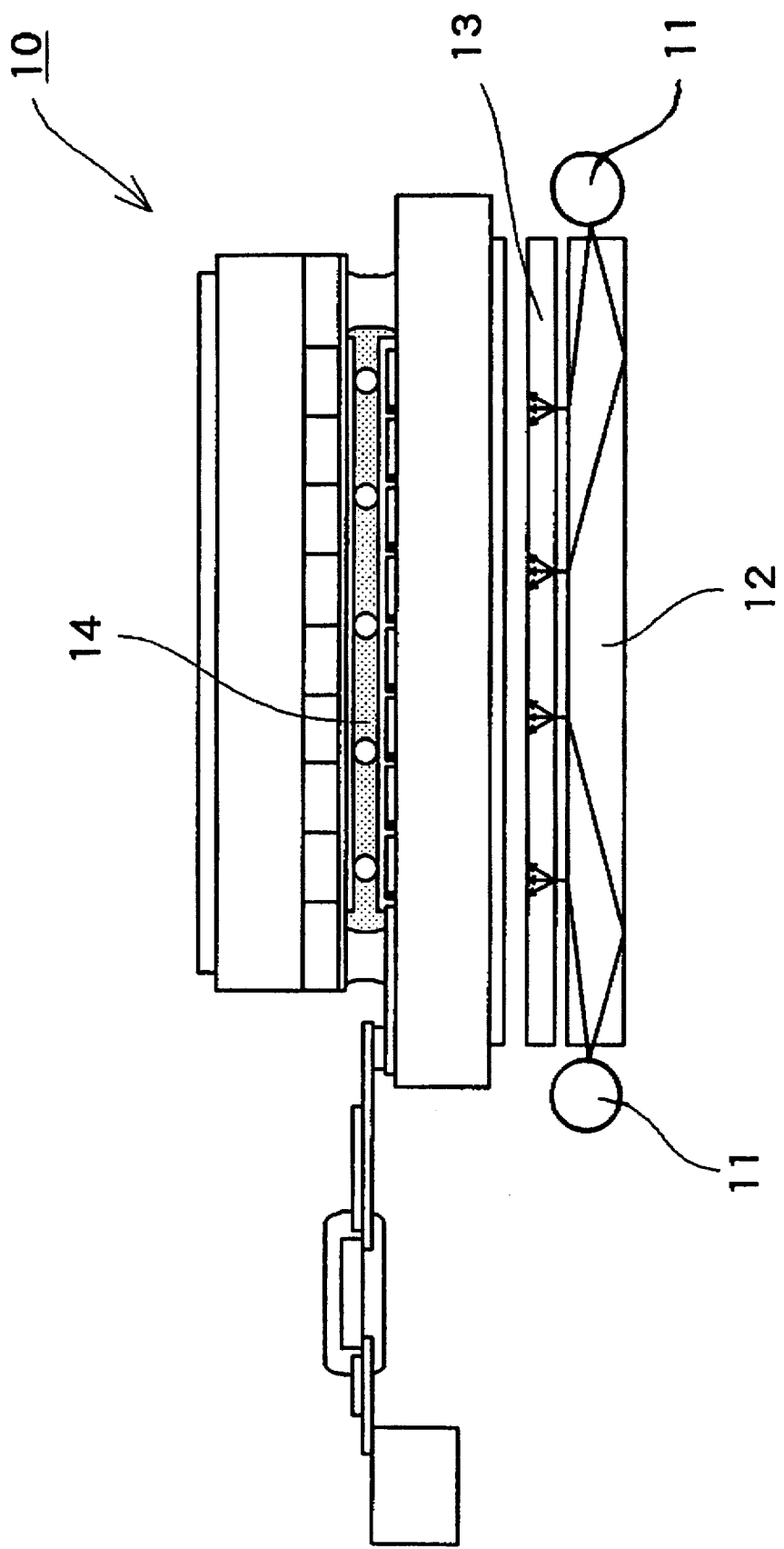
FIG. 6 is a sectional view showing the structure of a liquid crystal display according to the prior art.

According to one manner of use, an adhesive layer 7 may be provided on the bottom face of the base material sheet 2 as shown in FIG. 3 (a) and a printing portion 8 may be provided on the adhesive layer 7 as shown in FIG. 3 (b) so that patterns such as characters can be displayed. In addition, a release paper can be removably affixed to the adhesive layer 7 so as to attach the light diffusing sheet member 1 to an object. Those skilled in the art can easily understand the foregoing.

Furthermore, a synthetic resin layer having bead particles such as silica or carbon mixed therein may be applied on cloth, nonwoven fabric, a compound base material sheet formed by affixing a vinyl chloride resin sheet to cloth, or the like. In this case, there can be provided an excellent light diffusing sheet which can widely be used as an antireflection sheet.

EXAMPLE I

5 Parts by weight of "PTC LN hardening agent" (manufactured by DAINICHI SEIKA KABUSHIKI KAISHA) as a hardening agent was mixed with 100 parts by weight of a coating main agent ("RUB coating agent" manufactured by DAINICHI SEIKA KABUSHIKI KAISHA) containing acrylic beads (having a size of 5 to 40 μm) as a resin of a two-liquid hardening type. The mixture thus prepared was applied at a thickness of 15 to 20 μm (including no beads) on the top face of a polyethylene terephthalate (PET) sheet ("PET T-100" manufactured by DIAPHOYL KABUSHIKI KAISHA) as a base material having a thickness of 100 μm by a known blade roll coating method.

The results of characteristic tests of a sheet member thus prepared are as follows:

Optical characteristics:

| | |
|---|---|
| light transmittance | 88.9% |
| | (by JIS K 7105 A method) |
| Haze | 84.9(%) |
| | (by JIS K 7105) |
| Surface reflectance: | 10.7% |
| | (by JIS K 7105 A method) |
| Surface electric resistance | $10^{14}(\Omega)$ |
| | (by JIS K 6911) |
| Surface hardness | Pencil hardness |
| | (not less than 4H) |
| | (by JIS K 5400) |

EXAMPLE 2

5 Parts by weight of "PTC LN hardening agent" (manufactured by DAINICHI SEIKA KABUSHIKI KAISHA) as a hardening agent was mixed with 100 parts by weight of a coating main agent ("RUB coating agent" manufactured by DAINICHI SEIKA KABUSHIKI KAISHA) containing acrylic beads (having a size of 30 to 40 µm) as a resin of a two-liquid hardening type. The mixture thus prepared was applied at a thickness of 15 to 20 µm (including no beads) on the top face of a vinyl chloride sheet ("hard vinyl chloride sheet" manufactured by RIKEN VINYL KOGYO KABUSHIKI KAISHA) as a base material having a thickness of 0.1 mm by a known blade roll coating method.

The results of characteristic tests given to a sheet member thus prepared are as follows:

Surface hardness:
   Pencil hardness (not less than 4 H) (by JIS K 5400)
   Taber's abrasion resistance test (not greater than $10^{-3}$ g) (by ASTM D 1044)
Adhesion:
   There was used a label having an adhesion of 1200 gf/25 mm or more to a stainless plate.
Affix:
   40° C., 40 g/cm² ×24 hr.
Evaluation:
   There was confirmed the presence of adhesion after release at an angle of 90°—no adhesion)
Surface reflectance: not greater than 10% (by JIS K 7105 A method)

According to the light diffusing sheet member having the above-mentioned structure of the present invention, a light diffusing layer is formed on the surface of a transparent base material sheet. The light diffusing layer is a transparent synthetic resin layer having transparent beads mixed therein. The beads have different sizes and include particles buried in the synthetic resin layer and particles which at least partially project from the synthetic resin layer.

Thus, Light transmitted from below the base material sheet passes through the base material sheet and then through the light diffusing layer. Consequently, the light is uniformly diffused by the bead particles mixed in the light diffusing layer.

Accordingly, if the light diffusing sheet member of the present invention is used as a diffusing plate provided on the back of a liquid crystal panel in a liquid crystal display, light transmitted from a light source can be diffused more uniformly than in the prior art. Thus, there can be provided a light diffusing sheet member as a diffusing plate by which the luminance of a screen of a light diffusing plate liquid crystal display portion is sufficient and a user can view characters, graphics and the like displayed on the screen from different angles.

In case a metal deposition layer is formed on the back of the base material sheet of the light diffusing sheet member according to the present invention, light transmitted through the side of the base material sheet is reflected by a metal deposition face and an interface between the base material sheet and the light diffusing layer and is guided to the light diffusing layer so as to be diffused uniformly.

On the back of the liquid crystal panel in the liquid crystal display, the light diffusing sheet member can function as a reflecting plate, a guide plate and a diffusing plate according to the prior art.

For example, in case the light diffusing sheet member of the present invention is placed on or affixed to the front interior member of a car 20, in particular a top face 22 of a dash board 21 as shown in FIG. 5, light A transmitted through a front glass 24 is irregularly reflected. Consequently, the front interior member of the car 20, in particular the dash board, is mirrored in the front face of the front glass so that it is possible to prevent a driver's view from being interrupted.

In order to prevent the light of lighting equipment from being reflected by the display portion of a transparent liquid crystal panel of a clock or a digital meter of a car, a screen of a word processor or a computer, and the like, so that the display portion or screen is hard to look at, the light diffusing sheet member of the present invention can be used on the surface of a member which should prevent light from being reflected, for example, can be affixed to the surfaces of members around a CRT (Cathode Ray Tube) of OA devices or the like. Thus, remarkable effects can be obtained.

Although the present invention has fully been described by way of example with reference to the accompanying drawings, it is to be understood that various changes and modifications will be apparent to those skilled in the art. However, unless such changes and modifications depart from the scope of the invention, they should be construed as being included therein.

What is claimed is:

1. A light-diffusing sheet member comprising a transparent base material sheet and a light-diffusing layer formed on the surface of said base material sheet and made of a transparent synthetic resin layer having transparent beads mixed therein;

wherein said light-diffusing layer has beads of different particle sizes, the ratio of said beads to said synthetic resin layer is 30 to 90% by weight, and said light-diffusing layer has some of said beads buried therein and other of said beads projecting partially therefrom.

2. A light-diffusing sheet member according to claim 1, wherein said beads comprise small beads and large beads in the quantity ratio of from 1:99 to 99:1.

3. A light-diffusing sheet member according to claims 1 or 2, wherein said beads comprise the buried beads and the partially projected beads in the quantity ratio of from 1:99 to 99:1.

4. A light-diffusing sheet member comprising a base material sheet and a light-diffusing layer formed on the surface of said base material sheet and made of a synthetic resin layer having beads mixed therein;

wherein said light-diffusing layer has beads of different particle sizes, and said light-diffusing layer has some of said beads buried therein and other of said beads projecting partially therefrom, said light-diffusing sheet member further comprising a metal deposition layer formed on the back of said base material sheet.

* * * * *

UNITED STATES PATENT AND TRADEMARK OFFICE
CERTIFICATE OF CORRECTION

PATENT NO. : 5,706,134
DATED : January 6, 1998
INVENTOR(S) : TERUAKI KONNO, ET AL.

It is certified that error appears in the above-identified patent and that said Letters Patent is hereby corrected as shown below:

On the title page, under

[30] Foreign Application Priority Data, the data for the first application should read Jun. 22, 1992 [JP] Japan ............ 4-042936 U

[56] References Cited, the eighth reference listed, should be corrected to read -- 3,994,086 11/1976 Mizuochi --.

Signed and Sealed this

Eighteenth Day of May, 1999

Attest:

Q. TODD DICKINSON

*Attesting Officer*  *Acting Commissioner of Patents and Trademarks*